(12) United States Patent
Chen (10) Patent No.: US 8,713,659 B1
(45) Date of Patent: Apr. 29, 2014

(54) METHOD AND APPARATUS FOR ALLOCATING AND OBTAINING IP ADDRESS

(71) Applicant: Huawei Technologies Co., Ltd, Shenzhen (CN)

(72) Inventor: Manna Chen, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/017,020

(22) Filed: Sep. 3, 2013

(30) Foreign Application Priority Data

Nov. 2, 2012 (CN) .......................... 2012 1 0431931

(51) Int. Cl.
*G06F 7/04* (2006.01)
*G06F 9/00* (2006.01)
*H04L 29/06* (2006.01)

(52) U.S. Cl.
USPC ...................... 726/8; 726/5; 726/14; 713/153

(58) Field of Classification Search
USPC ..................... 726/8, 5, 14; 713/153
See application file for complete search history.

(56) References Cited

U.S. PATENT DOCUMENTS

| 7,251,826 B1* | 7/2007 | Gardos et al. ..................... 726/6 |
| 2004/0122976 A1* | 6/2004 | Dutta et al. ................... 709/245 |
| 2004/0228335 A1* | 11/2004 | Park et al. ...................... 370/352 |
| 2006/0168164 A1* | 7/2006 | Lemson et al. ............... 709/221 |
| 2007/0294760 A1* | 12/2007 | Sood ............................... 726/15 |

OTHER PUBLICATIONS

Aboba, B. et al., "Extensible Authentication Protocol (EAP)," Networking Working Group, Jun. 2004, 71 pages.

"IEEE Standard for Local and metropolitan area networks-Port-Based Network Access Contrl," IEEE Std 802.1X-2001, The Institute of Electrical and Electronics Engineers, Inc., Jul. 13, 2001, 142 pages.

Rigney, C. et al., "Remote Authentication Dial in User Service (RADIUS)," Network Working Group, Jun. 2000, 81 pages.

* cited by examiner

*Primary Examiner* — Mohammad W Reza
(74) *Attorney, Agent, or Firm* — Slater & Matsil, L.L.P.

(57) ABSTRACT

A switch sends an authentication request message to a client at intervals of a preset duration. A response message sent by the client is received. The response message carries authentication information of a user carried on the client. An authentication message is sent to a server according to the response message. An authentication reply message sent by the server is received. The authentication reply message carries information about an authentication domain authorized by the server to the user. It is determined, according to the authentication reply message, whether the authentication domain of the user is changed. If the authentication domain of the user is changed, an authentication domain change message is sent to the client according to the authentication reply message, so that the client obtains an IP address again.

19 Claims, 4 Drawing Sheets

METHOD AND APPARATUS FOR ALLOCATING AND OBTAINING IP ADDRESS

CROSS-REFERENCE TO RELATED APPLICATIONS

This application claims priority to Chinese Patent Application No. 201210431931.8, filed on Nov. 2, 2012, which is hereby incorporated by reference in its entirety.

TECHNICAL FIELD

The present disclosure relates to the field of communications and, in particular embodiments, to a method and an apparatus for allocating and obtaining an IP address.

BACKGROUND

In a network admission control (NAC) system of a communication layer L3 that implements forwarding based on IP addresses, a switch allocates a corresponding IP address to a client according to an authentication domain planned by an authentication server for a user. When the authentication domain planned by the authentication server for the user is changed, the IP address of the client is not changed. In this case, the user can access neither resources in the previous authentication domain nor resources in the current authentication domain; the user can access resources in the current authentication domain only when the user manually releases the previous IP address and reapplies for an IP address.

In the prior art, before the authentication server switches the authentication domain of the user, ports of the switch are temporarily disabled, and the ports are re-enabled after the authentication domain of the user is switched. If the client is directly connected to the switch, the network interface card of the client is disconnected and connected according to states of the switch ports, and obtains an IP address corresponding to the current authentication domain in a reconnection process, without manual operations performed by the user.

However, the prior art only applies to a scenario where the client is directly connected to the switch. When other devices are connected between the client and the switch, the client cannot perceive whether the ports of the switch are disabled or enabled, and therefore cannot obtain a new IP address. In addition, in an actual network, a switch port is connected to more than one client. When the port is disabled or enabled, connections between the switch and other clients are affected. This features high operation costs, strong constraints, and poor scalability.

SUMMARY OF THE INVENTION

Embodiments of the present disclosure provide a method and an apparatus for allocating and obtaining an IP address. A client is notified that an authentication domain of a user carried on the client is changed, so that the client automatically obtains a fresh IP address, thereby solving problems of strong constraints and poor scalability in the prior art.

According to a first aspect, the present disclosure provides a method for allocating an IP address. The method includes sending an authentication request message to a client at intervals of a preset duration and receiving a response message sent by the client. The response message carries authentication information of a user carried on the client. The method also includes sending an authentication message to a server according to the response message and receiving an authentication reply message sent by the server. The authentication reply message carries information about an authentication domain authorized by the server to the user. It is determined, according to the authentication reply message, whether the authentication domain of the user is changed, and if the authentication domain of the user is changed, an authentication domain change message is sent to the client according to the authentication reply message, so that the client obtains an IP address again according to the authentication domain change message.

According to a second aspect, the present disclosure provides a method for obtaining an IP address. The method includes receiving an authentication request message sent by a switch at intervals of a preset duration and sending a response message to the switch. The response message carries authentication information of a user carried on a client, so that the switch sends an authentication message to a server according to the response message. If an authentication domain of the user is changed, an authentication domain change message sent by the switch is received. The authentication domain change message is generated by the switch according to an authentication reply message sent by the server. An IP address is obtained again according to the authentication domain change message.

According to a third aspect, the present disclosure provides an apparatus for allocating an IP address. A first sending unit is configured to send an authentication request message to a client at intervals of a preset duration. A first receiving unit is configured to receive a response message sent by the client. The response message carries authentication information of a user carried on the client. A second sending unit is configured to send an authentication message to a server according to the response message. A second receiving unit is configured to receive an authentication reply message sent by the server. The authentication reply message carries information about an authentication domain authorized by the server to the user. A determining unit is configured to determine, according to the authentication reply message, whether the authentication domain of the user is changed. The first sending unit is further configured to send an authentication domain change message to the client according to the authentication reply message if the authentication domain of the user is changed, so that the client obtains an IP address again according to the authentication domain change message.

According to a fourth aspect, the present disclosure provides an apparatus for obtaining an IP address. A receiving unit is configured to receive an authentication request message sent by a switch at intervals of a preset duration. A sending unit is configured to send a response message to the switch. Where the response message carries authentication information of a user carried on a client, so that the switch sends an authentication message to a server according to the response message. The receiving unit is further configured to receive an authentication domain change message sent by the switch if an authentication domain of the user is changed. The authentication domain change message is generated by the switch according to an authentication reply message sent by the server. An obtaining unit is configured to obtain an IP address again according to the authentication domain change message.

With the present disclosure, a client is notified, by using a message, that an authentication domain of a user carried on the client is modified. In this way, when other networks or devices connected between a switch and the client, the client can also perceive that the authentication domain of the user carried on the client is changed, and automatically obtain an IP address again. In addition, when one client updates an IP address, connections between other clients and the switch are not affected. The present disclosure has an extensive application scope, and can reduce deployment difficulties and operation and maintenance costs of the system.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

To make the objectives, technical solutions, and advantages of the present disclosure more comprehensible, the following further describes the present disclosure with reference to the accompanying drawings. Apparently, the embodiments described herein are merely a part rather than all of the embodiments of the present disclosure. All other embodiments obtained by a person of ordinary skill in the art based on the embodiments of the present disclosure without creative efforts shall fall within the protection scope of the present disclosure.

Figure 1:
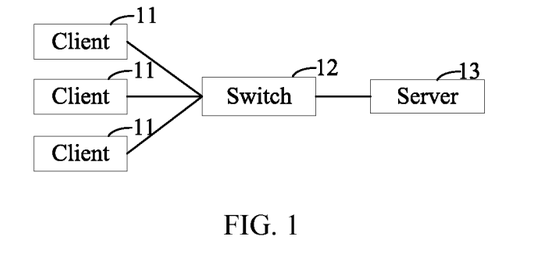
FIG. 1 is a schematic diagram of a system architecture according to an embodiment of the present disclosure.

The following firstly describes an application scenario of a method for allocating an IP address according to an embodiment of the present disclosure. FIG. 1 is a schematic diagram of a system architecture according to an embodiment of the present disclosure.

The method for allocating an IP address provided in the embodiment of the present disclosure applies to an L3 NAC system, where the L3 NAC system includes a client 11, a switch 12, and a server 13. When the client 11 is authenticated for the first time, after receiving an initiated authentication message sent by the client 11, the switch 12 sends an authentication request message to the client 11 so as to request authentication information of a user carried on the client 11. Then, the switch 12 receives a response message sent by the client 11, where the response message carries authentication information of the user (for example, such information as user name that can identify a user identity, and such information as password that can authenticate the user). Then, the switch 12 sends the authentication information of the user carried in the response message to the server 13. The server 13 authenticates the user according to the authentication information of the user. After the authentication succeeds, the server 13 sends an authentication success message to the client 11 through the switch 12. The client 11 starts a Dynamic Host Configuration Protocol (DHCP) process to obtain an IP address corresponding to an authentication domain of the client 11.

Specifically, the authentication domain refers to a database that can be accessed by a successfully authenticated user. The server 13 may divide the database into different authentication domains according to different user rights, and different authentication domains are accessed only by IP addresses in different address pools. For example, a client having an IP address in an IP address pool 1 can only access resources in an authentication domain 1, while a client having an IP address in an IP address pool 2 can only access resources in an authentication domain 2.

After the server authenticates the user successfully, it is assumed that the user rights allow access to resources in the authentication domain 1. When receiving an address allocation request (DHCP request) of the client, the DHCP server selects an IP address from the IP address pool corresponding to the authentication domain 1 and allocates the selected IP address to the client. The DHCP server may be integrated into the switch 12 or be set independently. When the DHCP server is set independently, the switch 12 acts as a DHCP relay to forward DHCP messages between the client and the DHCP server.

After the server 13 modifies the authentication domain of the user carried on the client 11, it is assumed that resources that the user is authorized to access are moved from the authentication domain 1 to the authentication domain 2. At this time, the client 11 can neither obtain the resources by accessing the authentication domain 1 nor access the authentication domain 2, and the client 11 needs to obtain an IP address again that can access the authentication domain 2 to establish a normal connection with the network. Therefore, the present disclosure provides a method for allocating an IP address, that is, in a process of re-authenticating the client 11 by the server 13, the server 13 sends information about the authentication domain of the client to the switch 12. When the authentication domain of the user is changed, the switch 12 sends an authentication domain change message to the client 11, so that the client 11 determines, according to the received authentication domain change message, whether the authentication domain of the user carried on the client is changed, and automatically obtains an IP address again when the authentication domain of the user is changed.

The following describes in detail the present disclosure by using a specific embodiment.

Figure 2:
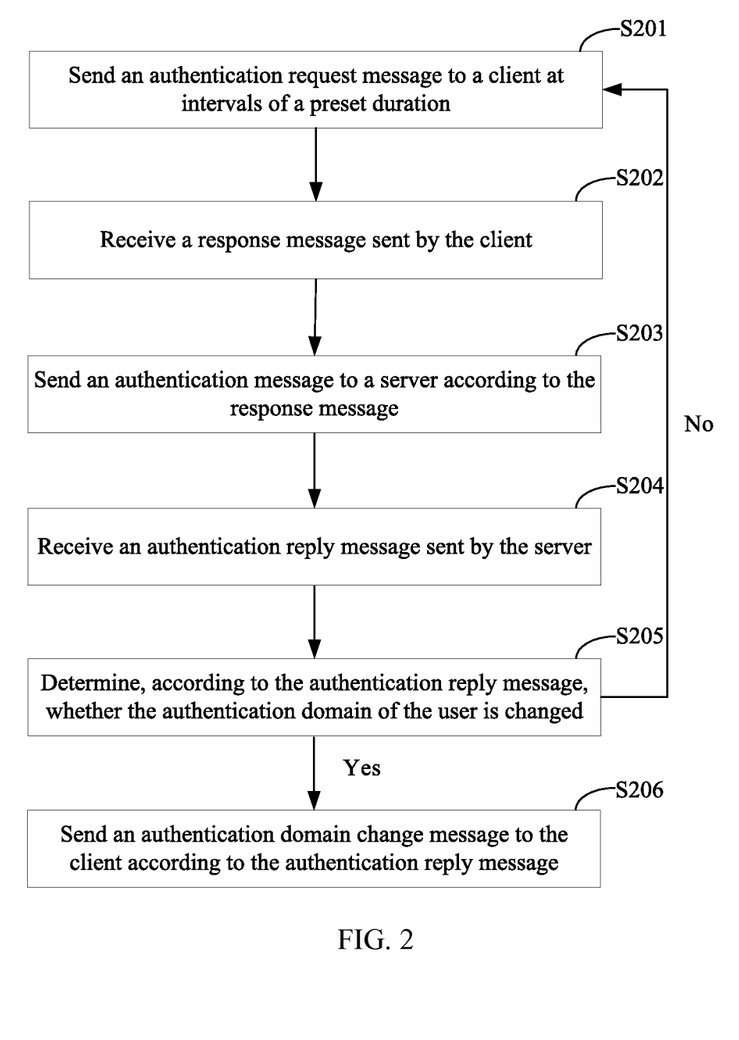
FIG. 2 is a flowchart of a method for allocating an IP address according to an embodiment of the present disclosure.

FIG. 2 is a flowchart of a method for allocating an IP address according to an embodiment of the present disclosure. The method may be performed by the switch 12 illustrated in FIG. 1. Specifically, the method includes the following steps.

Step S201: Send an authentication request message to a client at intervals of a preset duration.

The authentication request message is used to notify the client that re-authentication is needed, that is, it is used to instruct the client to re-send authentication information of a user carried on the client.

Further, the preset duration is pre-configured according to a re-authentication time interval authorized by a server. To ensure that the client normally obtains resources, the server needs to re-authenticate the authentication information of the user carried on the client on a timed basis, so that when an authentication domain of the user is changed, the client is capable of obtaining a fresh IP address in time.

Step S202: Receive a response message sent by the client.

The response message carries the authentication information of the user carried on the client.

Step S203: Send an authentication message to the server according to the response message.

After receiving the response message sent by the client, the switch sends, by using the authentication message, the authentication information of the user carried in the response message to the server, so that the server authenticates the user.

Step S204: Receive an authentication reply message sent by the server.

The authentication reply message carries information about an authentication domain authorized by the server to the user, so that the switch determines, according to the information about the authentication domain authorized by the server to the user, whether the authentication domain of the user is changed.

Step S205: Determine, according to the authentication reply message, whether the authentication domain of the user is changed.

Specifically, if the authentication reply message indicates that the user authentication succeeds, the server sends, by using the authentication reply message, information about a post-authentication domain authorized to the user to the switch. The switch determines, according to information about the post-authentication domain authorized to the user, whether the post-authentication domain of the user is changed. If the post-authentication domain authorized by the server to the user is different from a previous post-authentication domain, step S206 is performed. If the post-authentication domain authorized by the server to the user is the same as the previous post-authentication domain, step S206 is not performed and step S201 is performed again. The post-authentication domain refers to an authentication domain that can be accessed by the user after the user authentication succeeds. A pre-authentication domain refers to an authentication domain that can be accessed by the user before the user authentication is completed. That before the authentication is completed includes the following two cases: authentication fails and no authentication is performed.

If the authentication reply message indicates that the user authentication fails, the server sends, by using the authentication reply message, information about the pre-authentication domain authorized to the user to the switch. When the user authentication fails, the authentication domain of the user is changed inevitably. Therefore, after receiving the authentication reply message indicating that the user authentication fails, the switch can directly determine that the authentication domain of the user is changed, and then step S206 is directly performed.

Step S206: Send an authentication domain change message to the client according to the authentication reply message.

Specifically, the switch constructs the authentication change message according to the information about the authorization domain authorized by the server to the user and carried in the authentication reply message, and sends the authentication domain change message to the client, so that the client obtains an IP address again according to the authentication domain change message.

Preferentially, if the authentication domain change message carries an identifier instructing the client to obtain an IP address again, the client establishes a DHCP process according to the identifier that is carried in the authentication domain change message and instructs the client to obtain an IP address again, and obtains an IP address again by establishing the DHCP process.

Preferentially, if the authentication domain change message carries an IP address identifier allocated to the client, the client performs refreshing automatically, and obtains an IP address from the IP address identifier that is allocated to the client and carried in the authentication domain change message. By using this manner of obtaining an IP address, the client can directly obtain a fresh IP address by refreshing without the need of initiating a new DHCP process again. This is more convenient and faster and can save network overheads.

Preferentially, if the authentication reply message indicates that the user authentication succeeds, the authentication domain change message is an EAPo1 Success message. The identifier that instructs the client to obtain an IP address again and is carried in the authentication domain change message or the IP address identifier that is allocated to the client and carried in the authentication domain change message is an option identifier in a TLV format.

Preferentially, if the authentication reply message indicates that the user authentication fails, the authentication domain change message is an EAPo1 Failure message; and the identifier that instructs the client to obtain an IP address again and is carried in the authentication domain change message or the IP address identifier that is allocated to the client and carried in the authentication domain change message is an option identifier in a TLV format.

By using the method for allocating an IP address provided in this embodiment, when other networks or devices are connected between a switch and a client, the client can automatically perceive, according to an authentication domain change message sent by the switch, whether an authentication domain of a user carried on the client is changed. In this way, when the authentication domain of the user is changed, the client can automatically obtain an IP address again. In addition, in a process of obtaining an IP address again by the client, normal connections between other clients and the switch are not affected.

Figure 3:
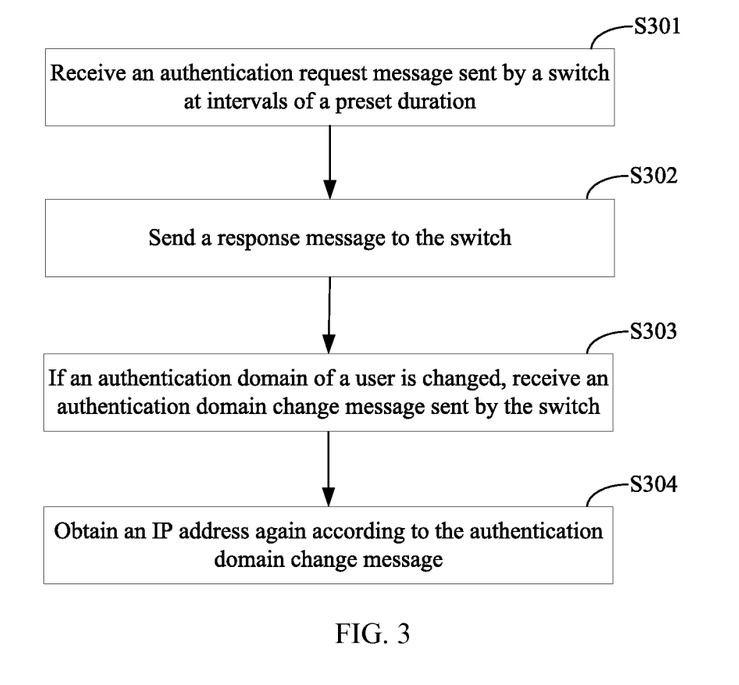
FIG. 3 is a flowchart of a method for obtaining an IP address according to an embodiment of the present disclosure.

FIG. 3 is a flowchart of a method for obtaining an IP address according to an embodiment of the present disclosure. An executor of the method is a client. Specifically, the method includes the following steps:

Step S301: Receive an authentication request message sent by a switch at intervals of a preset duration.

The authentication request message is used by the switch to request authentication information of a user carried on the client.

The preset duration is pre-configured by the switch according to a re-authentication time interval authorized by a server.

Step S302: Send a response message to the switch.

The response message carries the authentication information of the user carried on the client, so that the switch sends, by using an authentication message, the authentication information of the user carried in the response message to the server.

Step S303: If an authentication domain of the user is changed, receive an authentication domain change message sent by the switch.

The authentication domain change message is generated by a switching office according to the authentication reply message sent by the server.

Specifically, after receiving an authentication message, the server authenticates the authentication information of the user carried in the authentication message. Then, the server sends the authentication reply message to the switch, where the authentication reply message carries information about an authentication domain authorized by the server to the user. After receiving the authentication reply message, the switch determines, according to the information that is about the authentication domain authorized by the server to the user and carried in the authentication reply message, whether the authentication domain of the user is changed. If the authentication domain authorized by the server to the user is different from a previous authentication domain, the switch constructs the authentication domain change message according to the information about the authentication domain authorized by the server to the user. The switch sends the authentication domain change message to the client.

Preferentially, the authentication domain change message carries an identifier instructing the client to obtain an IP address again or carries an IP address identifier allocated to the client.

Preferentially, if the authentication reply message indicates that the user authentication succeeds, the authentication domain change message is an EAPol Success message. The identifier that instructs the client to obtain an IP address again and is carried in the authentication domain change message or the IP address identifier that is allocated to the client and carried in the authentication domain change message is an option identifier in a TLV format.

Preferentially, if the authentication reply message indicates that the user authentication fails, the authentication domain change message is an EAPol Failure message; and the identifier that instructs the client to obtain an IP address again and is carried in the authentication domain change message or the IP address identifier that is allocated to the client and carried in the authentication domain change message is an option identifier in a TLV format.

Step S304: Obtain an IP address again according to the authentication domain change message.

After receiving the authentication domain change message, the client determines whether the authentication domain of the user carried on the client is changed; if the authentication domain of the user carried on the client is changed, the client obtains an IP address again automatically according to the authentication domain change message.

Preferentially, if the authentication domain change message carries an identifier instructing the client to obtain an IP address again, the client establishes a DHCP process according to the identifier that is carried in the authentication domain change message and instructs the client to obtain an IP address again, and obtains an IP address again by establishing the DHCP process.

Preferentially, if the authentication domain change message carries an IP address identifier allocated to the client, the client performs refreshing automatically, and obtains an IP address from the IP address identifier that is allocated to the client and carried in the authentication domain change message. By using this manner of obtaining an IP address, the client can directly obtain a fresh IP address by refreshing without the need of initiating a new DHCP process again. This is more convenient and faster and can save network overheads.

By using the method for obtaining an IP address provided in this embodiment, a client receives an authentication domain change message that is sent by a switch and carries an identifier instructing the client to obtain an IP address again or carries an IP address identifier allocated to the client. In this way, in the case where other networks or devices are connected between the switch and the client, when an authentication domain of a user carried on the client is changed, the client can also perceive that the authentication domain of the user carried on the client is changed, and obtain an IP address again. In addition, in a process of obtaining an IP address again by the client, normal connections between other clients and the switch are not affected.

Figure 4:
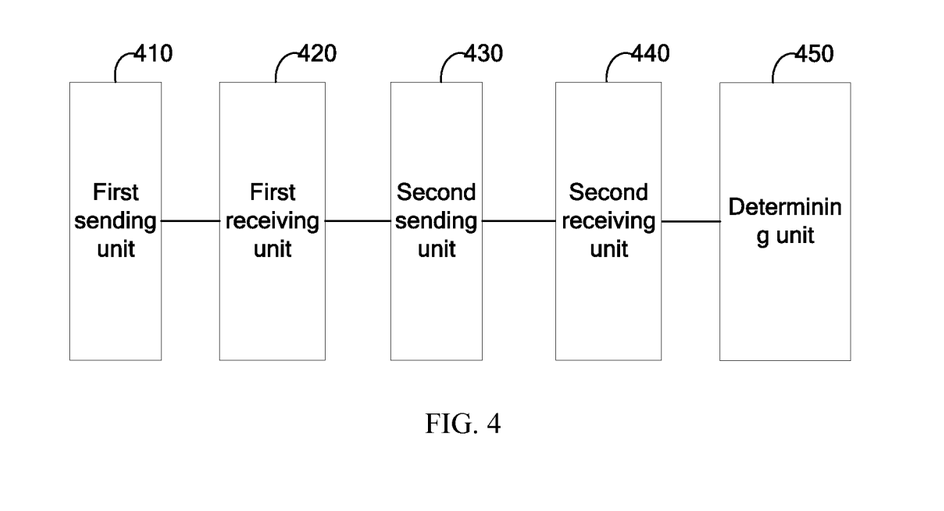
FIG. 4 is a schematic structural diagram of an apparatus for allocating an IP address according to an embodiment of the present disclosure.

Accordingly, the present disclosure provides an apparatus for allocating an IP address, where the apparatus applies to a switch. FIG. 4 is a schematic structural diagram of an apparatus for allocating an IP address according to an embodiment of the present disclosure. The apparatus includes a first sending unit 410, a first receiving unit 420, a second sending unit 430, a second receiving unit 440, and a determining unit 450.

The first sending unit 410 is configured to send an authentication request message to a client at intervals of a preset duration.

The authentication request message is used to notify the client that re-authentication is needed, that is, it is used to instruct the client to re-send authentication information of a user carried on the client.

Further, the preset duration is pre-configured according to a re-authentication time interval authorized by a server. To ensure that the client normally obtains resources, the server needs to re-authenticate the authentication information of the user carried on the client on a timed basis, so that when an authentication domain of the user is changed, the client is capable of obtaining a fresh IP address in time.

Figure 5:
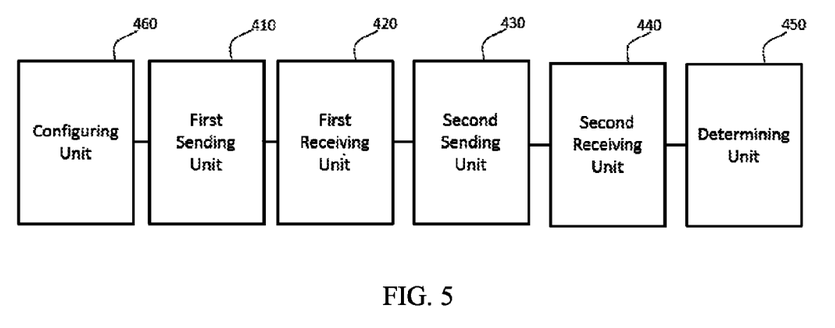
FIG. 5 is a schematic structural diagram of another apparatus for allocating an IP address according to an embodiment of the present disclosure.

Therefore, the apparatus for allocating an IP address further includes a configuring unit 460. FIG. 5 is a schematic structural diagram of another apparatus for allocating an IP address according to an embodiment of the present disclosure. The configuring unit 460 is configured to pre-configure the foregoing preset duration according to a re-authentication time interval authorized by the server.

The first receiving unit 420 is configured to receive a response message sent by the client, where the response message carries the authentication information of the user carried on the client.

The second sending unit 430 is configured to send an authentication message to the server according to the response message.

After the first receiving unit 420 receives the response message sent by the client, the second sending unit 430 sends, by using the authentication message, the authentication information of the user carried in the response message to the server, so that the server authenticates the user.

The second receiving unit 440 is configured to receive an authentication reply message sent by the server, where the authentication reply message carries information about an authentication domain authorized by the server to the user.

The determining unit 450 is configured to determine, according to the authentication reply message, whether the authentication domain of the user is changed.

Specifically, if the authentication reply message indicates that the user authentication succeeds, the authentication reply message carries information about a post-authentication domain authorized by the server to the user. The determining unit 450 determines, according to the information about the post-authentication domain authorized by the server to the user, whether the post-authorization domain of the user is changed; if the post-authentication domain authorized by the server to the user is different from a previous post-authentication domain, the determining unit 450 determines that the authentication domain of the user is changed.

If the authentication reply message indicates that the user authentication fails, the authentication reply message carries information about a pre-authentication domain authorized by the server to the user. When the user authentication fails, the authentication domain of the user is changed inevitably.

Therefore, after the second receiving unit 440 receives the authentication reply message indicating that the user authentication fails, the determining unit 450 can directly determine that the authentication domain of the user is changed.

The first sending unit 410 is further configured to send an authentication domain change message to the client according to the authentication reply message if the authentication domain of the user is changed, so that the client obtains an IP address again according to the authentication domain change message.

Preferentially, if the authentication domain change message carries an identifier instructing the client to obtain an IP address again, the client establishes a DHCP process according to the identifier that is carried in the authentication domain change message and instructs the client to obtain an IP address again, and obtains an IP address again by establishing the DHCP process.

Preferentially, if the authentication domain change message carries an IP address identifier allocated to the client, the client performs refreshing automatically, and obtains an IP address from the IP address identifier that is allocated to the client and carried in the authentication domain change message. By using this manner of obtaining an IP address, the client can directly obtain a fresh IP address by refreshing without the need of initiating a new DHCP process again. This is more convenient and faster and can save network overheads.

By using the apparatus for allocating an IP address provided in this embodiment, when an authentication domain of a user carried on a client is changed, the apparatus sends an authentication domain change message to the client according to a received authentication reply message. In this way, when other networks or devices are connected between a switch and the client, the client can also perceive that the authentication domain of the user carried on the user is changed and obtain an IP address again. In addition, in a process of obtaining an IP address again by the client, normal connections between other clients and the switch are not affected.

Figure 6:
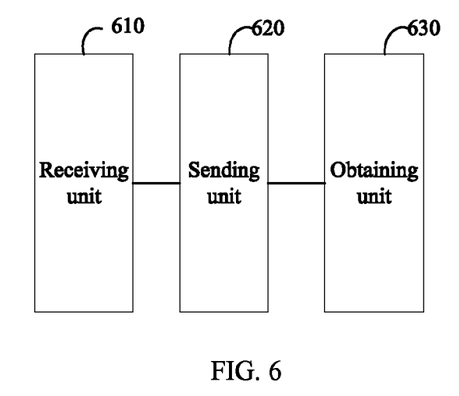
FIG. 6 is a schematic structural diagram of an apparatus for obtaining an IP address according to an embodiment of the present disclosure.

Accordingly, the present disclosure provides an apparatus for obtaining an IP address, where the apparatus applies to a client. FIG. 6 is a schematic structural diagram of an apparatus for obtaining an IP address according to an embodiment of the present disclosure. The apparatus includes a receiving unit 610, a sending unit 620, and an obtaining unit 630.

The receiving unit 610 is configured to receive an authentication request message sent by a switch at intervals of a preset duration.

The authentication request message is used by the switch to request authentication information of a user carried on the client.

The preset duration is pre-configured by the switch according to a re-authentication time interval authorized by a server.

The sending unit 620 is configured to send a response message to the switch, where the response message carries the authentication information of the user carried on the client, so that the switch sends an authentication message to the server according to the response message.

After receiving the response message, the switch sends, by using the authentication message, the authentication information of the user carried in the response message to the server, so that the server authenticates the user.

The receiving unit 610 is further configured to receive an authentication domain change message sent by the switch if an authentication domain of the user is changed, where the authentication domain change message is generated by the switch according to an authentication reply message sent by the server.

Specifically, after receiving the authentication message, the server authenticates the authentication information of the user carried in the authentication message. Then, the server sends the authentication reply message to the switch, where the authentication reply message carries information about an authentication domain authorized by the server to the user. After receiving the authentication reply message, the switch determines, according to the information that is about the authentication domain authorized by the server to the user and carried in the authentication reply message, whether the authentication domain of the user is changed; if the authentication domain authorized by the server to the user is different from a previous authentication domain, the switch constructs the authentication domain change message according to the information about the authentication domain authorized by the server to the user. The switch sends the authentication domain change message to the client. The receiving unit 610 receives the authentication domain change message.

Preferentially, the authentication domain change message carries an identifier instructing the client to obtain an IP address again or carries an IP address identifier allocated to the client.

The obtaining unit 630 is configured to obtain an IP address again according to the authentication domain change message.

Preferentially, if the authentication domain change message carries an identifier instructing the client to obtain an IP address again, the obtaining unit 630 establishes a DHCP process according to the identifier that is carried in the authentication domain change message and instructs the client to obtain an IP address again, and obtains an IP address again by establishing the DHCP process.

Preferentially, if the authentication domain change message carries an IP address identifier allocated to the client, the obtaining unit 630 performs refreshing automatically, and obtains an IP address from the IP address identifier that is allocated to the client and carried in the authentication domain change message. By using this manner of obtaining an IP address, the client can directly obtain a fresh IP address by refreshing without the need of initiating a new DHCP process again. This is more convenient and faster and can save network overheads.

By using the apparatus for obtaining an IP address provided in this embodiment, the apparatus receives an authentication domain change message that is sent by a switch and carries an identifier instructing a client to obtain an IP address again or carries an IP address identifier allocated to a client. In this way, in the case where other networks or devices are connected between the switch and the client, when an authentication domain of a user carried on the client is changed, the client can also perceive that the authentication domain of the user carried on the client is changed, and obtain an IP address again. In addition, in a process of obtaining an IP address again by the client, normal connections between other clients and the switch are not affected.

Figure 7:
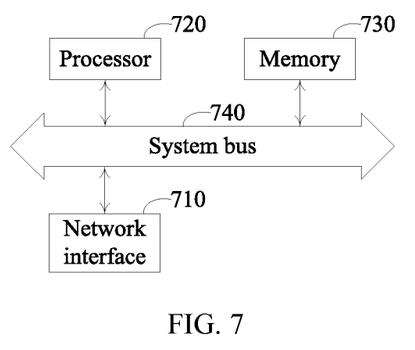
FIG. 7 is another schematic structural diagram of an apparatus for allocating an IP address according to an embodiment of the present disclosure.

In addition, an apparatus for allocating an IP address provided in the embodiment of the present disclosure may be implemented by using another manner. FIG. 7 is another schematic structural diagram of an apparatus for allocating an IP address according to an embodiment of the present disclosure. The apparatus for allocating an IP address applies to a switch and includes a network interface 710, a processor 720, a memory 730, and a system bus 740.

The system bus 740 is configured to connect to the network interface 710, the processor 720, and the memory 730.

The network interface 710 is configured to communicate with other devices, the apparatus, and the server.

The memory 730 may be a permanent memory, such as a hard disk driver and a flash memory, and the memory 730 is provided with a software module and device driver programs. The software module is capable of executing each functional module of the foregoing method of the present disclosure; the device driver programs may be driver programs of a network and an interface.

When the apparatus is started, the software components are loaded to the memory 730, and then are accessed by the processor 720 to perform the following instructions sending an authentication request message to a client at intervals of a preset duration, receiving a response message sent by the client, where the response message carries authentication information of a user carried on the client, sending an authentication message to a server according to the response message, receiving an authentication reply message sent by the server, where the authentication reply message carries information about an authentication domain authorized by the server to the user, determining, according to the authentication reply message, whether the authentication domain of the user is changed, and if the authentication domain of the user is changed, sending an authentication domain change message to the client according to the authentication reply message, so that the client obtains an IP address again according to the authentication domain change message.

The apparatus for allocating an IP address provided in this embodiment informs, by using a message, the client that the authentication domain of the user carried on the client is modified and an IP address needs to be obtained again.

Preferentially, the authentication domain change message carries an identifier instructing the client to obtain an IP address again or carries an IP address identifier allocated to the client.

By using the apparatus for allocating an IP address provided in this embodiment, the apparatus sends, according to a received authentication reply message, an authentication domain change message that carries an identifier instructing a client to obtain an IP address again or carries an IP address identifier allocated to a client. In this way, in the case where other networks or devices are connected between a switch and the client, when an authentication domain of a user carried on the client is changed, the client can also perceive that the authentication domain of the user carried on the client is changed, and obtain an IP address again. In addition, in a process of obtaining an IP address again by the client, normal connections between other clients and the switch are not affected.

Figure 8:
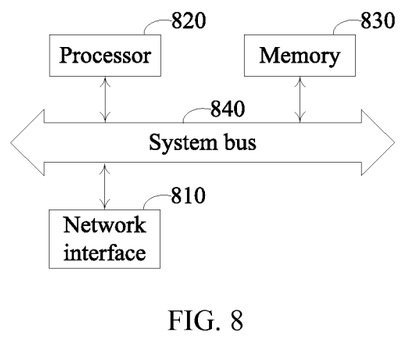
FIG. 8 is another schematic structural diagram of an apparatus for obtaining an IP address according to an embodiment of the present disclosure.

Further, an apparatus for obtaining an IP address provided in the embodiment of the present disclosure may be implemented by using another manner. FIG. 8 is another schematic structural diagram of an apparatus for obtaining an IP address according to an embodiment of the present disclosure. The apparatus for obtaining an IP address applies to a client and includes a network interface 810, a processor 820, a memory 830, and a system bus 840.

The system bus 840 is configured to connect to the network interface 810, the processor 820, and the memory 830.

The network interface 810 is configured to communicate with other devices, apparatuses, and servers.

The memory 830 may be a permanent memory, such as a hard disk driver and a flash memory, and the memory 830 has a software module and device driver programs. The software module is capable of executing each functional module of the foregoing method of the present disclosure; the device driver programs may be driver programs of a network and an interface.

When the apparatus is started, the software components are loaded to the memory 830, and then are accessed by the processor 820 to perform the following instructions receiving an authentication request message sent by a switch at intervals of a preset duration, sending a response message to the switch, where the response message carries authentication information of a user carried on the client, so that the switch sends an authentication message to a server according to the response message, if an authentication domain of the user is changed, receiving an authentication domain change message sent by the switch, where the authentication domain change message is generated by the switch according to the authentication reply message sent by the server, and obtaining an IP address again according to the authentication domain change message.

The apparatus for obtaining an IP address provided in this embodiment perceives, according to the authentication domain change message sent by the switch, that the authentication domain of the user carried on the client is changed, and obtains an IP address again according to the authentication domain change message.

Preferentially, if the authentication domain change message carries an identifier instructing the client to obtain an IP address again, a process instruction of obtaining an IP address again according to the authentication domain change message is specifically as follows.

A DHCP process is established according to the identifier that is carried in the authentication domain change message and instructs the client to obtain an IP address again. In IP address is obtained again by establishing the DHCP process.

Preferentially, if the authentication domain change message carries an IP address allocated to the client, the obtaining an IP address again according to the authentication domain change message is specifically as follows obtaining an IP address from the IP address identifier that is allocated to the client and carried in the authentication domain change message by refreshing.

By using the apparatus for obtaining an IP address provided in this embodiment, an authentication domain change message that carries an identifier instructing a client to obtain an IP address again or carries an IP address identifier allocated to a client is received from a switch. In this way, in the case where other networks or devices are connected between the switch and the client, when an authentication domain of a user carried on the client is changed, the client can also perceive that the authentication domain of the user carried on the client is changed, and obtain an IP address again. In addition, in a process of obtaining an IP address again by the client, normal connections between other clients and the switch are not affected.

Those skilled in the art may be further aware that units and steps provided in each embodiment disclosed in the specification can be implemented by electronic hardware, computer software or a combination thereof. For clear description of the interchangeability between hardware and software, components and steps of each embodiment are generally described in the foregoing description according to the functionality. Whether these functions are executed by hardware or software depends on specific applications and design constraints of the technical solution. Those skilled in the art can implement the described functions of each specific application by using different methods, but the implementation should not depart from the scope of the present disclosure.

The steps of the method or algorithm according to the embodiments disclosed herein can be implemented by hardware or software modules executed by a processor, or implemented by a combination thereof. The software module may be stored in a random access memory (RAM) memory, read-only memory (ROM), electrically programmable ROM, electrically erasable programmable ROM, register, hard disk, removable magnetic disk, CD-ROM or any other forms of storage media commonly known in the art.

The objectives, technical solutions, and benefits of the present disclosure are further described in detail in the foregoing specific embodiments. It should be understood that the foregoing descriptions are merely specific embodiments of the present disclosure, but are not intended to limit the protection scope of the present disclosure. Any modification, equivalent replacement, or improvement made within the principle of the present disclosure shall fall within the protection scope of the present disclosure.

What is claimed is:

1. A method for allocating an IP address, the method comprising:
    sending an authentication request message to a client at intervals of a preset duration, wherein the authentication request message is used to instruct the client to re-send authentication information of a user;
    receiving a response message sent by the client, wherein the response message carries authentication information of the user;
    sending an authentication message to a server according to the response message, wherein the authentication message carries the authentication information of the user;
    receiving an authentication reply message sent by the server, wherein the authentication reply message carries information about an authentication domain authorized by the server to the user, wherein the authentication domain comprises a database that can be accessed by the user;
    determining, according to the authentication reply message, whether the authentication domain of the user is changed; and
    if the authentication domain of the user is changed, sending an authentication domain change message to the client according to the authentication reply message, wherein the authentication domain change message is used to enable the client to obtain a new IP address according to the authentication domain change message.

2. The method according to claim 1, wherein no authentication domain change message is sent to the client when the authentication domain of the user is not changed.

3. The method according to claim 1, wherein the authentication domain change message carries an IP address identifier allocated to the client.

4. The method according to claim 1, wherein the authentication domain change message carries an identifier instructing the client to obtain the new IP address.

5. The method according to claim 4, wherein the authentication reply message indicates that user authentication succeeds and wherein the authentication domain change message is an EAPol Success message of a LAN-based Extensible Authentication Protocol and the identifier is an option identifier in a type-length-value (TLV) format.

6. The method according to claim 4, wherein the authentication reply message indicates that user authentication fails and wherein the authentication domain change message is an EAPol Failure message of a LAN-based Extensible Authentication Protocol and the identifier is an option identifier in a type-length-value (TLV) format.

7. The method according to claim 1, wherein the preset duration is pre-configured according to a re-authentication time interval authorized by the server.

8. A method for obtaining an IP address, the method comprising:
    receiving an authentication request message sent by a switch at intervals of a preset duration, wherein the authentication request message is used to instruct a client to re-send authentication information of a user;
    sending a response message to the switch, wherein the response message carries authentication information of the user;
    if an authentication domain of the user is changed, receiving an authentication domain change message sent by the switch, wherein the authentication domain change message is generated by the switch according to an authentication reply message sent by a server, the authentication domain comprising a database that can be accessed by the user; and
    obtaining a new IP address according to the authentication domain change message.

9. The method according to claim 8, wherein the authentication domain change message carries an identifier instructing the client to obtain the new IP address and wherein obtaining the new IP address according to the authentication domain change message comprises establishing a DHCP process according to the identifier so as to obtain the new IP address.

10. The method according to claim 9, wherein the authentication reply message indicates that user authentication succeeds and wherein the authentication domain change message is an EAPol Success message and the identifier is an option identifier in a TVL format.

11. The method according to claim 9, wherein the authentication reply message indicates that user authentication fails and wherein the authentication domain change message is an EAPol Failure message and the identifier is an option identifier in a TVL format.

12. The method according to claim 8, wherein the authentication domain change message carries an IP address identifier allocated to the client and wherein the obtaining the new IP address according to the authentication domain change message comprises obtaining the new IP address from the IP address identifier allocated to the client.

13. An apparatus for allocating an IP address, the apparatus comprising:
    a first sending unit, configured to send an authentication request message to a client at intervals of a preset duration, wherein the authentication request message is used to instruct the client to re-send authentication information of a user;
    a first receiving unit, configured to receive a response message sent by the client, wherein the response message carries authentication information of the user;
    a second sending unit, configured to send an authentication message to a server according to the response message, wherein the authentication message carries the authentication information of the user;
    a second receiving unit, configured to receive an authentication reply message sent by the server, wherein the authentication reply message carries information about an authentication domain authorized by the server to the user, wherein the authentication domain comprises a database that can be accessed by the user; and
    a determining unit, configured to determine, according to the authentication reply message, whether the authentication domain of the user is changed;

wherein the first sending unit is further configured to send an authentication domain change message to the client according to the authentication reply message if the authentication domain of the user is changed, wherein the authentication domain change message is used to enable the client to obtain a new IP address according to the authentication domain change message.

14. The apparatus according to claim 13, wherein the authentication domain change message carries an identifier instructing the client to obtain the new IP address.

15. The apparatus according to claim 13, wherein the authentication domain change message carries an IP address identifier allocated to the client.

16. The apparatus according to claim 13, further comprising:
   a configuring unit, configured to pre-configure the preset duration according to a re-authentication time interval authorized by the server.

17. An apparatus for obtaining an IP address, the apparatus comprising:
   a receiving unit, configured to receive an authentication request message sent by a switch at intervals of a preset duration, wherein the authentication request message is used to instruct a client to re-send authentication information of a user; and
   a sending unit, configured to send a response message to the switch, wherein the response message carries authentication information of the user;
   wherein the receiving unit is further configured to, if an authentication domain of the user is changed, receive an authentication domain change message sent by the switch, wherein the authentication domain change message is generated by the switch according to an authentication reply message sent by a server, the authentication domain comprises a database that can be accessed by the user; and
   an obtaining unit, configured to obtain a new IP address according to the authentication domain change message.

18. The apparatus according to claim 17, wherein when the authentication domain change message carries an identifier instructing the client to obtain the new IP address, the obtaining unit is specifically configured to:
   establish a DHCP process according to the identifier so as to obtain the new IP address.

19. The apparatus according to claim 17, wherein when the authentication domain change message carries an IP address identifier allocated to the client, the obtaining unit is specifically configured to:
   obtain the new IP address from the IP address identifier allocated to the client.

* * * * *